United States Patent [19]

Zilch

[11] Patent Number: 4,905,762

[45] Date of Patent: Mar. 6, 1990

[54] INHIBITING WAX DEPOSITION FROM A WAX-CONTAINING OIL

[75] Inventor: Horst E. Zilch, Yorba Linda, Calif.

[73] Assignee: Union Oil Company of California, Los Angeles, Calif.

[21] Appl. No.: 292,386

[22] Filed: Dec. 30, 1988

[51] Int. Cl.[4] ............................................. E21B 47/06
[52] U.S. Cl. ..................................... 166/310; 166/371; 252/8.552
[58] Field of Search ............... 166/279, 304, 310, 371, 166/902; 252/8.552, 8.553

[56] References Cited

U.S. PATENT DOCUMENTS

| | | | |
|---|---|---|---|
| 3,669,189 | 6/1972 | Fischer | 166/304 X |
| 4,045,360 | 8/1977 | Fischer et al. | 166/304 X |
| 4,660,645 | 4/1987 | Newlove et al. | 166/304 |
| 4,693,312 | 9/1987 | Lenderman | 166/304 X |
| 4,755,230 | 7/1988 | Ashton et al. | 252/8.552 X |

*Primary Examiner*—George A. Suchfield
*Attorney, Agent, or Firm*—Yale S. Finkle; Arthur E. Oaks; Gregory F. Wirzbicki

[57] ABSTRACT

A method for inhibiting the deposition of wax in an oil well producing a wax-containing petroleum from a subterranean formation comprises injecting into the oil pool at the base of said well a copolymer comprised of ethylene and vinyl acetate and having an average molecular weight between about 15,000 and about 35,000.

20 Claims, No Drawings

INHIBITING WAX DEPOSITION FROM A WAX-CONTAINING OIL

BACKGROUND OF THE INVENTION

1. Field of the invention

This invention relates to the prevention of wax deposits from wax-containing oil, and more particularly to a method for inhibiting the formation of wax deposits in oil wells producing said wax-containing oils.

2. Description of the Prior Art

In the production of most wax-containing crude petroleum drawn from subterranean formations a major problem occurs when the oil is cooled below the solidification temperature of the wax therein. When this happens, the wax solidifies and tends to precipitate out and deposit on the piping within the well, as well as any other equipment which may subsequently be contacted by the cooled petroleum. These precipitates are mostly straight-chain paraffin hydrocarbons having empirical structures ranging from $C_{18}H_{38}$ to $C_{38}H_{78}$.

While the solid precipitates can be crystalline or amorphous, it is generally believed that, in most cases, paraffins precipitate from crude oil as crystalline dendrites having branches radiating out from a central spine. Because of these branches, the crystals easily agglomerate to form interlocking networks which absorb oil and form thick, voluminous gel-like structures which restrict and, in extreme cases, halt the flow of the oil from the well. Even a small amount of wax can significantly lower the amount of oil which can easily be removed from the well. It is known that wax tends to deposit more readily on rough surfaces than on a smooth surface so that the rough metal surfaces typically found on the interior of well piping are ideally suited for such deposition. Once deposition starts, such deposition usually continues unabated until the well is plugged and oil production stopped, and costly and often frequent cleaning are then required to maintain operation.

Various techniques for removing such deposits from wells have been proposed. For example, mechanical scrappers have been employed to maintain the interior surfaces of the well conduits free of wax accumulations. Another method involves pumping an oil, heated to a temperature which is above the melting point of the wax, back into the well. This will melt and dissolve the wax, thus freeing the well string and for a time, at least, bringing production back up to normal. However, both of these approaches are costly, complex, and only function to remove already formed wax accumulations rather than prevent the wax accumulation from forming initially.

Still another approach to this problem is the application of one or more polymeric "wax inhibitors" to prevent the wax deposits from forming in the first place. The exact mechanism by which these materials inhibit wax deposition and accumulation is not fully understood. In use, it is found that, in most cases, the inhibitor does not seem to reduce the size or change the general appearance of the individual wax crystals. Rather, it seems to change the surface characteristics of the crystals so that they exhibit a reduced tendency to adhere either to each other or to solid surfaces and, thus, are more readily kept in suspension. These inhibitors therefore differ from conventional pour-point depressants which generally reduce the low temperature viscosity of many types of viscous fluids, without necessarily affecting their wax deposition characteristics.

Although a number of copolymers have been developed for this purpose, most of these are applied to the petroleum after it has been brought to the surface to prevent the wax from fouling pumps and other equipment involved in the transportation and processing of the oil. However, most of these materials are expensive and/or must be used in concentrations in the range of about 1000 to 10,000 ppm to be effective.

The effectiveness of a wax-inhibitor in a given situation is highly unpredictable. For example, it has been found that even closely related polymers, composed of the same monomers but of somewhat different monomeric contents and/or average molecular weight, can exhibit radically different wax-inhibiting properties, both above ground and, most particularly, in the more hostile environmental conditions typically found in subterranean hot oil pools and in well piping leading therefrom to the surface. Likewise, merely because a particular wax inhibitor proves useful in one environment provides no indication as to its effectiveness in another e.g., an inhibitor highly effective for a waxy distillate may prove substantially less effective, or even ineffective, for use in the oil pools of subterranean formations, and vice versa. As a result, finding a superlative inhibitor for down-hole use, even within a class of polymers known to exhibit some degree of wax inhibition, is a task considered extremely difficult due to the inherent unpredictability involved.

SUMMARY OF THE INVENTION

The present invention provides a low cost, practical means for inhibiting the deposition and accumulation of wax in wells producing wax-containing petroleum.

Briefly the invention is a method for inhibiting wax deposition in wells producing wax-containing petroleum from subterranean formations comprising adding to the pool of said wax-containing oil at the base of the well a wax-inhibiting amount of a low cost, oil-dispersible or oil-soluble copolymer comprised of be&:ween about 62 and about 66 weight percent ethylene and about 34 and about 38 weight percent vinyl acetate, said copolymer having a molecular weight below about 35,000. The wax inhibitor may be admixed directly into the wax-containing oil, but is preferably supplied as a solution of the polymer in an organic solvent. Low concentrations of the agent, typically in the range between about 40 and about 1000 ppm, preferably between about 40 and about 200 ppm, effectively inhibit the deposition of wax and wax-like substances from wax-containing crude petroleum and thereby reduce the tendency of these substances to accumulate in well piping so that oil production can be maintained with minimum difficulty and at low cost. When used, as herein below described, in an oil well producing a wax-containing crude petroleum, the wax-inhibitor of the present invention is found to be surprisingly more effective in reducing wax deposition than are other copolymeric compositions having different vinyl acetate percentages and/or higher average molecular weights.

DETAILED DESCRIPTION OF THE INVENTION

The term "wax deposition" as used herein means the precipitation and accumulation of wax and wax-like materials on the surfaces contacted by a wax-containing oil, and not merely the precipitation of wax crystals or particles that remain dispersed in the oil.

In the method of the present invention, wax deposition in oil wells producing wax-containing crude oil from subterranean formations is effectively inhibited by introducing into the oil pool at the base of said well, a wax-inhibiting amount of an inhibitor comprising a copolymer comprised of between about 34 and about 38 weight percent vinyl acetate and between about 62 and about 66 weight percent ethylene, said copolymer having an average molecular weight below about 35,000 and, preferably, between about 15,000 and 35,000. In addition to a low molecular weight, such materials are typified by having (when diluted to about 10 percent by weight with hexane) pour points below about 5° F, preferably below about −10° F., and most preferably below about -30° F and viscosities below about 60 centistokes, preferably below about 20 centistokes, and most preferably below about 5 centistokes, at about 100° F.

Although the copolymeric wax deposition inhibitor can be added to the wax-containing oil directly, it is preferred that the inhibitor be first dissolved or dispersed in a carrier such as light crude oil or an organic solvent such as naphtha, kerosene, diesel fuel, gas oil, and similar petroleum derivatives. Other suitable carriers include various lower molecular weight alcohols, ketones, alkanes, cyclo-alkanes and aromatic solvents such as isopropyl alcohol, methyl ethyl ketone, hexane, cyclohexane, toluene and the like.

The concentration of inhibitor in the carrier can be varied over a wide range. The amount of additive needed to inhibit wax deposition will depend upon the properties of the particular crude petroleum, the amount and type of wax present, the temperature to which the wax-containing oil is cooled as it pumped out of the well, the particular type and physical arrangement of the process equipment used, the roughness of the piping surfaces contacted by the oil and the degree to which it is desired to inhibit wax deposition. Further, the particular amount of wax inhibitor employed in any given application depends not only upon these factors, but also upon the cost of the inhibitor as compared to the costs of cleaning the well and lost production due to wax plugging. Typically, the bulk inhibitor solution contains between about 1 and about 50 percent by weight of said polymer and when, used for down-hole applications, is applied at a rate to provide a concentration preferably between about 40 and about 200 ppm in the oil pool at the base of the well. The inhibitor solution can be added either by pumping it down in small diameter "macaroni" tubing, or by merely injecting the inhibitor into the annulus at the top of the well and allowing it to fall by gravity into the reservoir of oil in the well. In an application where the oil contains about 3 weight percent wax, as shown in Example 1 hereinbelow, they have been shown to be effective in polymer concentrations as low as 40 ppm. At these concentrations, a "cost/benefit" analysis for such use, as compared to prior art discontinuous methods is almost invariably positive.

Although the exact mechanism by which the inhibitors of the present invention inhibits wax deposition from a wax-containing oil is not completely understood, it has nevertheless been conclusively demonstrated that low concentrations of these agents are extremely effective in inhibiting the deposition of wax in the production of wax-containing oils at temperatures below the normal solidification temperature of the wax. It is understood that for the inhibitor to work as hereinabove described, the oil pool must be at a temperature above the melting point of the wax, i.e., the wax must be in solution before the inhibitor is admixed with the wax-containing oil. In producing oil wells, this is not usually a problem, particularly in wells where the oil pool is at a temperature of 160° F. or more. At such temperatures, the wax is most usually in solution.

When introduced into oil pools in subterranean formations, the inhibitor of the present invention has shown a surprising superiority to other polymeric inhibitors composed of the same monomers. Not only is it useful at very low concentrations where most others do not work very well, if at all, but also, and more significantly, as shown in Example 2 hereinafter, the invention eliminates the need to use auxiliary techniques such as scraping and hot oiling to remove accumulated wax in the well piping. The invention is further described by the following examples which are illustrative of specific modes of practicing the invention and are not intended as limiting the scope of the invention as defined in the appended claims.

EXAMPLE 1

Three samples each of 73 commercially available polymeric compositions were screened to determine their effectiveness in inhibiting wax deposition when used in a wax-containing hydrocarbon solution. A standard solution was prepared by dissolving 3 weight percent 130° F Aristowax in a composition of 70 percent kerosine and 30 percent 90-neutral oil by stirring the three component mixture at a temperature above the melting point of the wax and stirring until a clear homogeneous solution was produced. The kerosine-neutral oil solution closely approximates the solubility properties of many crude oils. The addition of paraffin wax insures that wax will precipitate from the solution it cools to room temperature.

The tests were performed in a 12 inch long by 3/4 inch diameter test tubes, each containing 50 cc of solution into which concentrations of 40, 100 and 200 ppm of each additive were added. The 73 groups of 3 test tubes (219 in all), after being well shaken to mix the additive therein, were positioned in a test tube rack and rotated to a 30-degree angle, in a cold room of 0° F. The results obtained are shown in Table 1 below.

TABLE 1

| Compound Added | Molecular Weight | % Vinyl Acetate | Appearance after 4 hours at 0° F. | | |
|---|---|---|---|---|---|
| | | | 40 ppm | 100 ppm | 200 ppm |
| Exxon Paradyne-25 | 21,000 | 36 | Lt Mushy | Very Lt Mushy | Liquid and Crystals |
| Exxon Paradyne-70 | | | Solid | Solid | Hvy Mushy |
| Exxon Paradyne-80 | | | Solid | Solid | Solid |
| Exxon Paradyne-85 | | | Solid | Solid | Solid |
| Amoco 547 | 32,000 | | Lt Mushy | Very Lt Mushy | Liquid and Crystals |

TABLE 1-continued

| Compound Added | Molecular Weight | % Vinyl Acetate | Appearance after 4 hours at 0° F. | | |
|---|---|---|---|---|---|
| | | | 40 ppm | 100 ppm | 200 ppm |
| Amoco 6603 | | | Solid | Solid | Almost Solid |
| Amoco 6604 | | | Solid | Solid | Almost Solid |
| Amoco 6605 | | | Solid | Solid | Almost Solid |
| Amoco 6249 | | | Solid | Solid | Almost Solid |
| Amoco 6238 | | | Solid | Solid | Solid |
| Amoco 6286 | | | Solid | Solid | Hvy Mushy |
| Amoco 6342 | | | Mushy | Very Lt Mushy | Very Lt Mushy |
| Sumitate Rb-11 (2 yr.old sol.) | 66,000 | 45 | Solid | Mushy | Very Lt Mushy |
| Sumitate Rb-11 (new) | | | Solid | Mushy | Very Lt Mushy |
| Elvax-40 | 68,000 | 40 | Solid | Mushy | Very Lt Mushy |
| Elvax-150 | 85,000 | 33 | Solid | Hvy Mushy | Lt Mushy |
| Elvax-210 | 46,000 | 28 | Solid | Hvy Mushy | Lt Mushy |
| Elvax-220 | | 28 | Solid | Hvy Mushy | Lt Mushy |
| Elvax-240 | 85,000 | 28 | Solid | Almost Solid | Hvy Mushy |
| Elvax-250 | | 28 | Solid | Solid | Hvy Mushy |
| Elvax-260 | 95,000 | 28 | Solid | Solid | Solid |
| Elvax-265 | | 28 | Solid | Solid | Solid |
| Elvax-310 | 40,000 | 25 | Solid | Very Hvy Mushy | Lt Mushy |
| Elvax-350 | 74,000 | 25 | Solid | Solid | Hvy Mushy |
| Elvax-360 | 110,000 | 25 | Solid | Solid | Solid |
| Elvax-410 | 37,000 | 18 | Solid | Solid | Mushy |
| Elvax-420 | | 18 | Solid | Solid | Solid |
| Elvax-460 | 95,000 | 18 | Solid | Solid | Solid |
| Elvax Terpolymer 4260 | | 28 | Solid | Solid | Almost Solid |
| Elvax Terpolymer 4310 | | 25 | Solid | Hvy Mushy | Lt Mushy |
| Elvax Terpolymer 4320 | | 25 | Solid | Very Hvy Mushy | Mushy |
| USI EY-901 | 105,000 | | Solid | Almost Solid | Lt Mushy |
| USI EY-902-30 | 62,000 | 40 | Solid | Mushy | Very Lt Mushy |
| USI EY-903 | 125,000 | 45 | Solid | Hvy Mushy | Lt Mushy |
| USI EY-904 | 131,000 | | Solid | Solid | Very Hvy Mushy |
| USI EY-905 | 111,000 | 51 | Solid | Solid | Almost Solid |
| USI EY-906 | | 55 | Solid | Solid | Solid |
| USI EY-908 | 125,000 | | Solid | Solid | Solid |
| USI EY-909 | | | Solid | Solid | Solid |
| USI UE-612-04 | 48,000 | 19 | Solid | Solid | Solid |
| USI UE-631-04 | 107,000 | 19 | Solid | Solid | Solid |
| USI UE-639-04 | 125,000 | 30 | Solid | Very Hvy Mushy | Mushy |
| USI UE-645-04 | 59,000 | 28 | Solid | Solid | Solid |
| USI UE-646-04 | | 28 | Solid | Almost Solid | Very Hvy Mushy |
| USI EY-649-04 | 38,000 | 19 | Solid | Solid | Solid |
| USI EY-649-04 | 42,000 | 28 | Almost Solid | Mushy | Very Lt Mushy |
| USI EY-654-04 | | 33 | Solid | Very Hvy Mushy | Lt Mushy |
| Chevron OFA-440-M | | | Solid | Solid | Solid |
| Visco-915 | | | Solid | Solid | Solid |
| Nalco 5351 | | | Solid | Almost Solid | Hvy Mushy |
| Tretolite Tolad T-31 | | | Solid | Solid | Solid |
| Tretolite Tolad T-61 | | | Solid | Solid | Solid |
| Tretolite Tolad 33 | | | Solid | Very Lt Mushy | Liquid and Crystals |
| Tretolite Tolad T-35 | | | Solid | Almost Solid | Liquid and Crystals |
| Tretolite Tolad T-60 | | | Solid | Solid | Solid |
| Exxon Corexit 7816 | | | Solid | Solid | Solid |
| Exxon Corexit 7826 | | | Solid | Solid | Solid |
| Exxon Corexit 7831 | | | Solid | Solid | Solid |
| Exxon Corexit 7833 | | | Solid | Solid | Solid |
| Cardinal Nocor 911 | | | Solid | Solid | Solid |
| Cardinal Nocor 920 | | | Solid | Solid | Solid |
| Jetco Jetsol 40 | | | Solid | Solid | Solid |
| Jetco Jetsol 50 | | | Solid | Solid | Solid |
| Jetco Jetsol 60 | | | Solid | Solid | Solid |
| Jetco Jetsperse 100 | | | Solid | Solid | Solid |
| Jetco Jetsperse 200 | | | Solid | Solid | Solid |
| Jetco Jetsperse 6182 | | | Solid | Solid | Solid |
| DuPont Perma Plasticizer | | | Solid | Solid | Solid |
| R&H Acryloid B-44 | | | Solid | Solid | Solid |
| R&H Acryloid B-4SN | | | Solid | Solid | Solid |
| R&H Acryloid B-50 | | | Solid | Solid | Solid |
| R&H Acryloid B-72 | | | Solid | Solid | Solid |
| R&H Acryloid B-82 | | | Solid | Solid | Solid |

These data show that of the 73 materials tested only the addition of Paradyne-25 and Amoco 547 resulted in the oil still retaining some degree of fluidity when present at a concentration of 40 ppm, with almost all of the remaining samples being frozen solid. Further, even with additive concentrations of 200 ppm, many of the tested samples exhibited greater quantities of wax precipitate than did Paradyne-25 and Amoco 547 at 40 ppm. Of those materials where the molecular weight is known, these two materials are the only ones with average molecular weights under about 35,000, and, of those where the vinyl acetate concentration is known, only Paradyne-25 comprises 34-38 weight percent vinyl acetate and 62-66 weight percent ethylene.

EXAMPLE 2

An operating well in Southern California pumped from a depth of about 6300 feet and producing 10 barrels of crude/day along with about 1 barrel of water/day was selected. The well was operating at a well head pressure of about 100 p.s.i. with a wax-inhibitor, Vynathene EY-902, comprised of about 40 percent vinyl acetate and about 60 percent polyethylene and having an average molecular weight of about 62,000. This was applied at an average concentration of about 60 ppm. With this inhibitor, it was necessary to "hot-oil" the well at monthly intervals to remove accumulated wax and maintain production. To apply the inhibitor, the well was equipped with a chemical pump to directly inject the wax-inhibitor down into the oil pool at the base of the well. This pump was mechanically operated by chain from the walking beam of the pumping unit, and the system was equipped with a 175 gallon feed tank and the necessary piping and valves to accomplish said injection.

Prior to the start of the present test the prior art additive was removed from the system, the well was hot oiled to remove any accumulated wax therein, and a 1 percent stock solution of Paradyne-25 in an aromatic solvent substituted therefore. For a period of almost seven months, about 2.8-3.0 gallons per day of this solution were applied down-hole at a rate sufficient to provide an inhibitor concentration of about 60 ppm (calculated as 100 percent active polymer) in the oil pool at the base of the well without periodically hot-oiling well string. At the conclusion of the test, oil production was unaffected and the well-head pressure ranged from a low of about 50 psi to a high of about 90 psi and was averaging about 70 psi and only the top nine of the 104 pipe stands in the well, each stand being 30 feet long, showed any wax deposition, the amount visually being judged as ranging from "slight" at the discharge of the well to "very-slight" on the seventh, eighth and ninth pipe-stands. The "wax" deposits in these stands typically contained about 2 percent asphaltenes and had a melting point of about 180° F. The well was then operated for a period of one month without any additive being used. At the conclusion of this time, heavy deposits of wax were observed throughout the well structure.

While the exact composition and molecular weights of many of the materials used in Example 1 is not known, there was one, Paradyne-25, wherein both the composition and molecular weight were found to fall within the ranges for these factors as defined above for the present invention. In view of the similarities in composition and molecular weight (in those compositions where these parameters are known) the marked superiority of Paradyne-25 to all but one of the other materials tested (which had a molecular weight below 35,000 but an unknown composition) is unexpected. When used for down-hole wax inhibition, as shown in Example 2, Paradyne-25 was particularly and unexpectedly superior to the Vynathane FY-902 used. While this material (Vynathene EY-902) is superficially similar to that of Paradyne-25 in composition (40 percent vinyl acetate vs. 36 percent in the sample tested), the polymer therein does have a higher molecular weight (62,000 vs. 21,000). The difference in wax-inhibitor performance observed in Example 2 is much greater than would be predictable, considering how similar these two compositions are.

Obviously many modifications and variations of this invention, as hereinabove set forth, may be made without departing from the spirit and scope thereof, and therefore only such limitations should be imposed as are indicated in the following claims. All embodiments which fall within the scope and equivalency of the claims are, therefore, intended to be embraced therein.

I claim:

1. A method for inhibiting wax deposition in an oil well producing a wax-containing oil comprising injecting down-hole into the oil-pool at the base of the well a wax-inhibiting amount of a copolymer of between about 62 and about 66 weight percent ethylene and about 34 and about 38 weight percent vinyl acetate, aid copolymer having an average molecular weight below about 35,000.

2. The method of claim 1 wherein said inhibiting amount is between about 40 and about 1000 ppm, based on the weight of the oil.

3. The method of claim 2 wherein the concentration of said wax-inhibitor is between about 40 and about 200 ppm, based on the weight of the oil, and the average molecular weight of said copolymer is between about 15,000 and about 35,000.

4. The method of claim 1 wherein the concentration of said wax-inhibitor is between about 40 and about 200 ppm based on the weight of the oil.

5. The method of claim 1 wherein said wax inhibitor is dissolved or dispersed in an organic solvent prior to being injected into said well.

6. The method of claim 5 wherein the concentration of said wax inhibitor in said solvent is between about 1 and about 50 percent.

7. The method of claim 1 wherein said wax-containing oil is at a temperature above the melting point of said wax before said wax inhibitor is admixed therein.

8. The method of claim 1 wherein said copolymer, when dissolved to form a 10 weight percent solution in hexane, has a pour point below about -30° F and a viscosity, at 100° F., below about 5 centistokes.

9. The method of claim 1 wherein said oil pool is at a temperature above about 160° F.

10. The method of claim 2 wherein said oil pool is at a temperature above about 160° F.

11. The method of claim 3 wherein said oil pool is at a temperature above about 160° F.

12. The method of claim 4 wherein said oil pool is at a temperature above about 160° F.

13. The method of claim 5 wherein said oil pool is at a temperature above about 160° F.

14. The method of claim 6 wherein said oil pool is at a temperature above about 160° F.

15. The method of claim 8 wherein said oil pool is at a temperature above about 160° F.

16. A method for inhibiting wax deposition in an oil well producing a wax-containing oil comprising injecting down-hole into said well and admixing said oil at the base thereof with between about 40 and about 200 ppm of a wax deposition inhibitor comprised of a copolymer of between about 62 and about 66 weight percent ethylene and about 34 and about 38 weight percent vinyl acetate, said copolymer having an average molecular weight between about 15,000 and about 35,000 and said oil at a temperature above the melting point of said wax.

17. The method of claim 16 wherein said copolymer, when dissolved to form a 10 weight percent solution in hexane, has a pour point below about −30° F. and a viscosity, at 100° F., below about 5 centistokes.

18. The method of claim 16 wherein said wax inhibitor is dissolved or dispersed in an organic solvent prior to being injected into said well.

19. The method of claim 16 wherein said wax-containing oil is at a temperature above about 180° F. when said wax inhibitor is admixed therein.

20. The method of claim 18 wherein the concentration of said wax inhibitor in said solvent is between about 1 and about 50 percent.

* * * * *

UNITED STATES PATENT AND TRADEMARK OFFICE
CERTIFICATE OF CORRECTION

PATENT NO. : 4,905,762

DATED : March 6, 1990

INVENTOR(S) : Horst E. Zilch

It is certified that error appears in the above-identified patent and that said Letters Patent is hereby corrected as shown below:

Column 8,
Claim 1, line 18, delete "aid" and insert --said--.

Col. 8,
Claim 2, line 21, delete "inhibiting" and insert --wax-inhibiting--;
line 23 before "oil" and after "the" insert --wax-containing--.

Col. 8,
Claim 3, line 25, delete "wax-inhibitor" and insert copolymer;
line 26 before "oil" and after "the" insert --wax-containing--.

Col. 8,
Claim 4, line 30, delete "wax-inhibitor" and insert --copolymer--;
line 31 before "oil" and after "the" insert --wax-containing--.

Col. 8,
Claim 5, line 32, delete "wax-inhibitor" and insert --copolymer--.

Col. 8,
Claim 6, line 36, delete "wax-inhibitor" and insert --copolymer--;
line 37, before "percent" and after "50" insert --weight--.

Col. 8,
Claim 7, line 40, delete "wax-inhibitor" and insert --copolymer--.

Col. 8,
Claim 16, line 68, before "at" and after "oil" insert --being--.

Col. 10, claim 20, line 5, after "50" and before "percent" insert --weight--.

Signed and Sealed this

Ninth Day of March, 1993

Attest:

STEPHEN G. KUNIN

*Attesting Officer*  Acting Commissioner of Patents and Trademarks